United States Patent
Stockham et al.

[15] 3,641,320
[45] Feb. 8, 1972

[54] RAINDROP COUNTER

[72] Inventors: John D. Stockham, Highland, Ind.; Lawrence B. Townsend, Downers Grove; Ronald L. Ohlhaber, Evanston; Thomas M. Scopelite, Flossmoor, all of Ill.

[73] Assignee: The United States of America as represented by the Secretary of the Air Force

[22] Filed: Dec. 23, 1970

[21] Appl. No.: 100,977

[52] U.S. Cl. .................. 235/92 PC, 235/92 R, 235/92 V, 235/92 PB, 356/207
[51] Int. Cl. .................................................. G06m 11/04
[58] Field of Search .................. 235/92 PC, 92 V, 92 PB; 356/102, 207

[56] References Cited

UNITED STATES PATENTS

| | | | |
|---|---|---|---|
| 3,015,440 | 1/1962 | Gerhardt | 235/92 PC |
| 3,061,672 | 10/1962 | Wyle | 235/92 PC |
| 3,408,485 | 10/1968 | Scott | 235/92 PC |

Primary Examiner—Maynard R. Wilbur
Assistant Examiner—Robert F. Gnuse
Attorney—Harry A. Herbert, Jr. and Julian L. Siegel

[57] ABSTRACT

A flashing light freezes raindrops with respect to time, the shadows are focused on a vidicon which detects the shadows and converts them to ideal video pulses. The number of scan lines intersecting the drops is determined by a series of line counters and the count is decoded into channels and printed.

3 Claims, 4 Drawing Figures

RAINDROP COUNTER

BACKGROUND OF THE INVENTION

The present invention offers an improvement over rainfall analyzers and raindrop counters used in the past, and offers a novel system of scanning and counting. This system can operate equally well at night or in sunlight, and can determine the size of droplets with diameters between one-fourth and 4 millimeters.

SUMMARY OF THE INVENTION

The images of raindrops falling in a controlled volume are formed on a sequential scan vidicon. The light source is an intermittently flashed Xenon tube located at the focus of an optical system. The tube is operated to freeze drops with respect to time. Parallel light is emitted from the optical system and directed through the rain field to the collector lens of the receiver. The parallel light is focused onto the face of a vidicon receiver by a telecentric optical system having selectable magnifications. The volume of rain field viewed is defined by the distance between the two movable hoods and the cross-sectional area of the parallel light beam which is focused onto the vidicon. The telecentric optical system ensures that only parallel light entering the receiver lens along the optic axis is transmitted to the vidicon. In this way stray light from external source is eliminated from the vidicon's field of view.

The image on the vidicon of a raindrop in the field of view is interrogated by the horizontal sequentially scanning beam of the vidicon. The number of scan lines intersecting the drop is determined, classified into a channel of specified line number ranges and related by prior calibration to the vertical height of the drop. In order to increase the number of drops counted, provision is made for simultaneous counting and sorting of a plurality of drops on each scan line. Assuming a log-normal rain distribution randomly distributed in space, a restriction of up to four drops corresponds to a drop density of up to 20 particles per field of view. Thus under optimum conditions the counter may detect the size up to 150 drops per second.

It is an object to provide a novel system for automatically counting and sizing raindrops.

It is another object to provide a raindrop counter that will operate equally well in sunlight or at night.

It is still another object to provide a raindrop counter that is capable of sizing drops between one-fourth and 4 millimeters.

These and other objects, advantages, features and objects of the invention will become more apparent from the following description taken in connection with the illustrative embodiment in the accompanying drawings.

DETAILED DESCRIPTION OF THE PREFERRED EMBODIMENT

Figure 1:
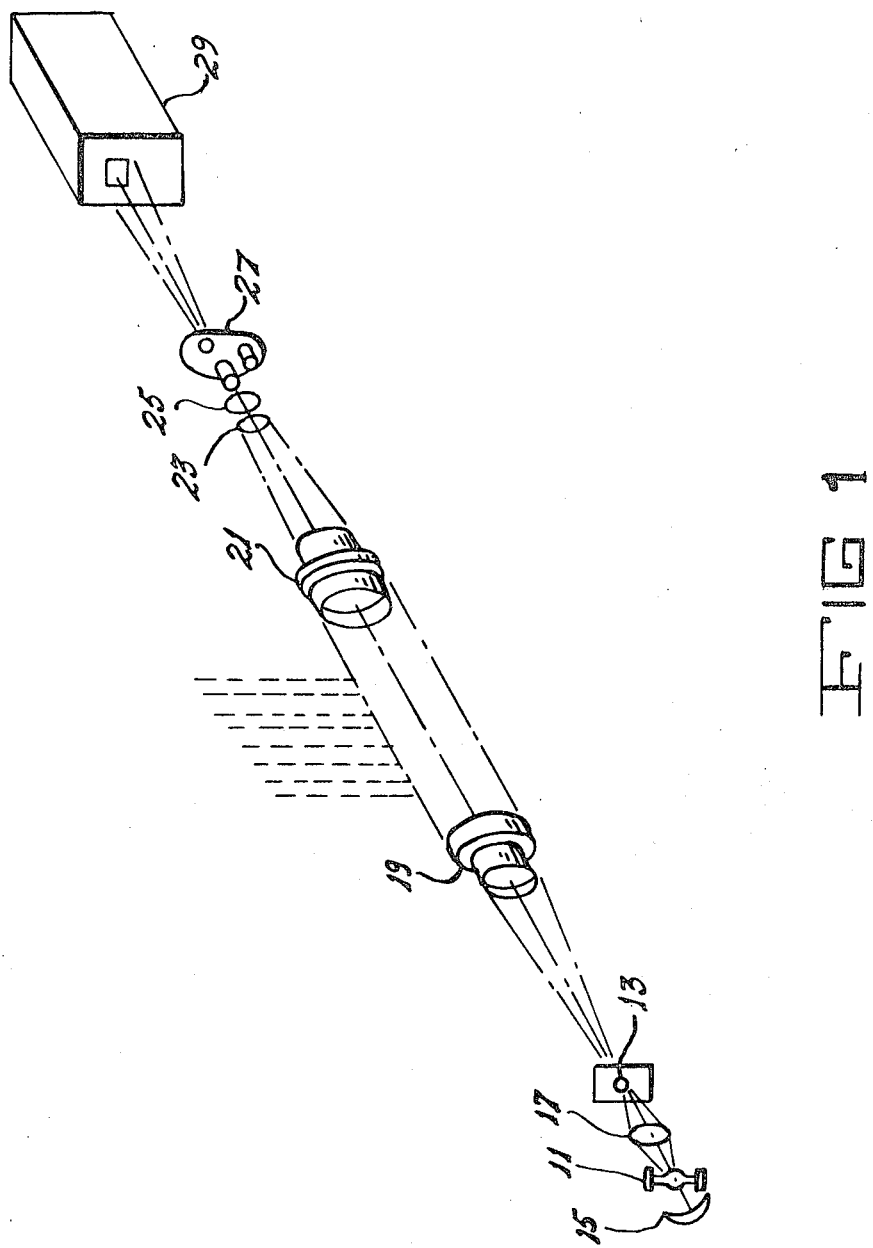
FIG. 1 shows schematically the equipment used on the optical bench when utilizing the invention.

The apparatus of FIG. 1 can be mounted on an optical bench in an area in which the rainfall is to be measured. Flash lamp 11 at the focus of the optical system can be a Xenon tube and is activated and projected through aperture 13 using mirror 15 and containing lens 17. The light is collimated by collimating lens 19 and passes through the rain field and through receiving lens 21 and then through filter 23 and imaging lens 25. The beam then passes through lens turret 27 and light receiver 29. The lens turret permits selectable magnifications. Adjustable hoods attached to lenses 19 and 21 can be provided to slide along the optical bench to limit the extent of the rain field falling between the light source 11 and light receiver 29.

Figure 2:
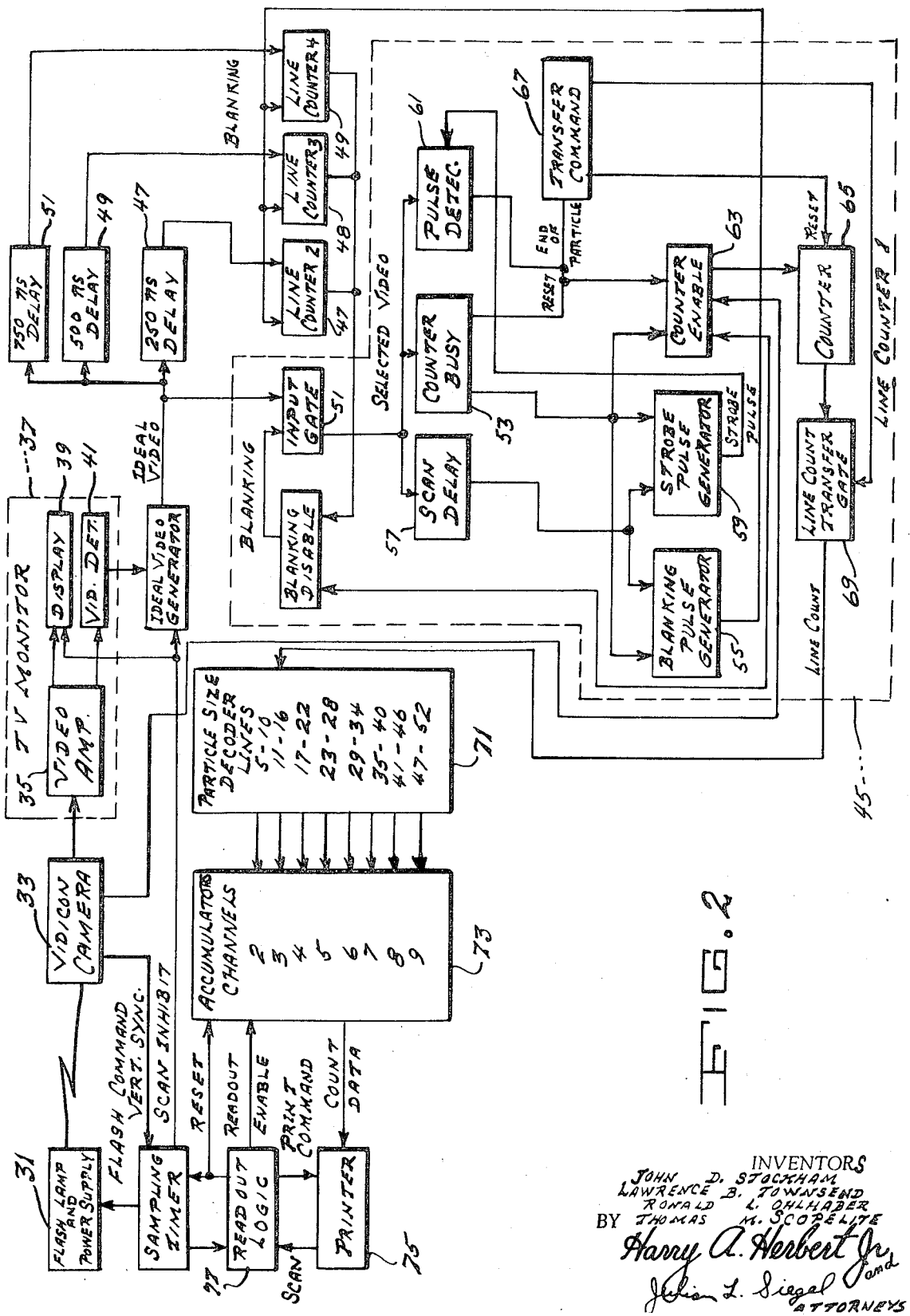
FIG. 2 is a block diagram of the electronic unit which contains the monitor to show the field of view being examined, the electronic signal data handling logic, the instrument control logic, and the data print out.

Referring to FIG. 2, flash tube light source 31 provides the illumination to view the raindrops by vidicon 33. The duration of the flash is chosen to arrest the motion of the raindrops and the intensity of the flash is chosen to be operative in either night or sunlight conditions. To understand the functions performed by the electronic network, assume that only one droplet image is on the vidicon 33, that the image is of such size that it is traversed by 10 scan lines, and that these lines are numbered 300 to 309 in the video raster.

Figure 3:
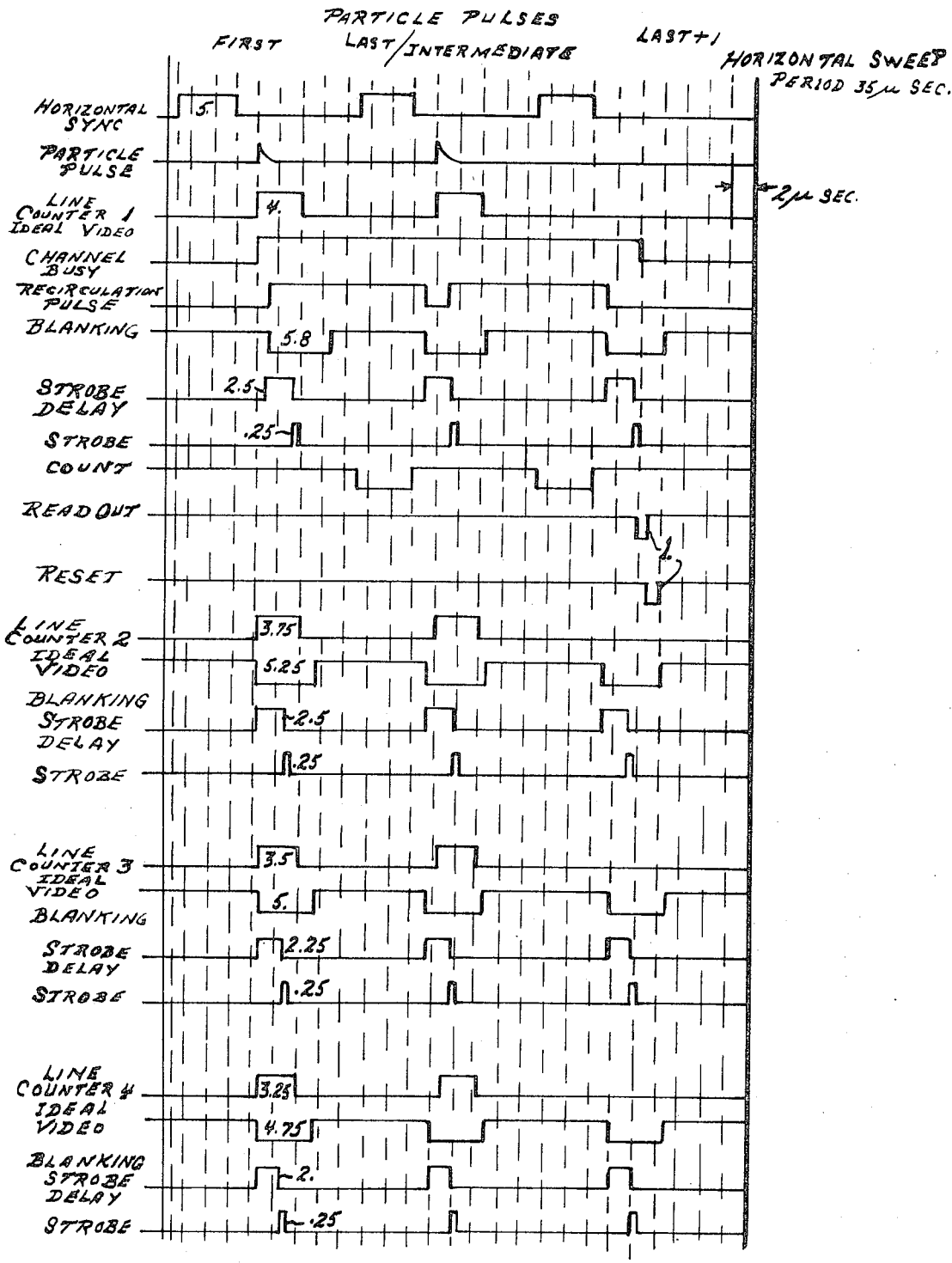
FIG. 3 is a timing diagram used in the explanation of the invention.

Reference to FIG. 3 showing the timing diagram aids the explanation. The numerical values shown representing pulse widths are in microseconds. A flash of light is generated during vertical retrace prior to scan. As scanning takes place, no signal is generated by lines numbered 1 to 299 and 310 to 945, since they do not traverse a droplet image. Lines 300 to 309 produce a pulse that is amplified by video amplifier 35 in television monitor 37. The droplet image is displayed by monitor display 39 as a bright circle on a dark background. Each of the amplified pulses generated by lines 300 to 309 is sequentially fed to video detector 41 which analyzes the rising slope of the leading edge of the pulse with respect to time.

A video pulse from line 300 on vidicon 33 is amplified and fed to video detector 41. Video detector 41 identifies the pulse as a particle pulse and feeds a pulse to the ideal video generator 43 and generates an ideal video pulse 4 μsec. long and having 5 volt amplitude. This pulse is simultaneously fed to line counter 1 designated as 45 and to each of three delays, 47, 49 and 51. After delays of 250, 500 and 750 nsec., respectively, the pulse is fed to line counters 2, 3 and 4 designated as 47–49, respectively. The details of these subsequent line counters are the same as that shown for line counter 1. Having been appropriately delayed and fed to one of the line counters, the pulse becomes a selected video pulse. The selected video pulse passes through input gate 51 of line counter 1 and fires counter busy flip-flop 53 which in turn fires blanking pulse generator 55, the counter enable and the strobe pulse generator 59. The blanking pulse generator produces a 5 μsec. pulse that is fed to line counters 2, 3 and 4 within 250 nsec. of the beginning of the ideal video pulse. Therefore the blanking pulse arrives at line counters 2, 3 and 4 inputs before the delayed ideal video pulse. The selected video pulse is stopped at the input gates so counters 2, 3 and 4 are not initiated.

Scan lines 311 through 900 continue with no counts recorded. Had a particle been on lines 303 through 320, two ideal video pulses would have been generated on scan lines 303 through 310. The second ideal video pulse could not be handled by line counter 1 because it is only capable of measuring a particle at one position of the scan line. The delayed ideal video pulse passes through line counter 2 input gate. This selected video pulse fires the counter busy flip-flop which in turn fires the blanking pulse generator, the counter enable, and the strobe pulse generator of line counter 2. The blanking pulse generator produces a 5 μsec. pulse that is fed to line counters 1, 3 and 4. The blanking pulse arrives at line counters 3 and 4 inputs before the delayed ideal video pulse. The pulse that might have passed input gate 51 of line counter 1 cannot pass because this counter will accept pulses only at one position in the horizontal scan. If a busy signal flip-flop 53 has been fired in a particular line counter, the horizontal sync pulse from camera 33 is fed thru the counter enable to advance the line count by one.

The selected video pulse from scan line 300 also triggers the scan delay. The scan delay waits 34 μsec. then triggers blanking pulse generator 55 and strobe pulse generator 59 on line 304. This blanking pulse which blanks the other line counters occurs about 1 μsec. before the ideal video pulse should occur. The strobe pulse is compared with the selected video as described above, and another horizontal sync pulse is counted in the counter of line counter 2.

Figure 4:
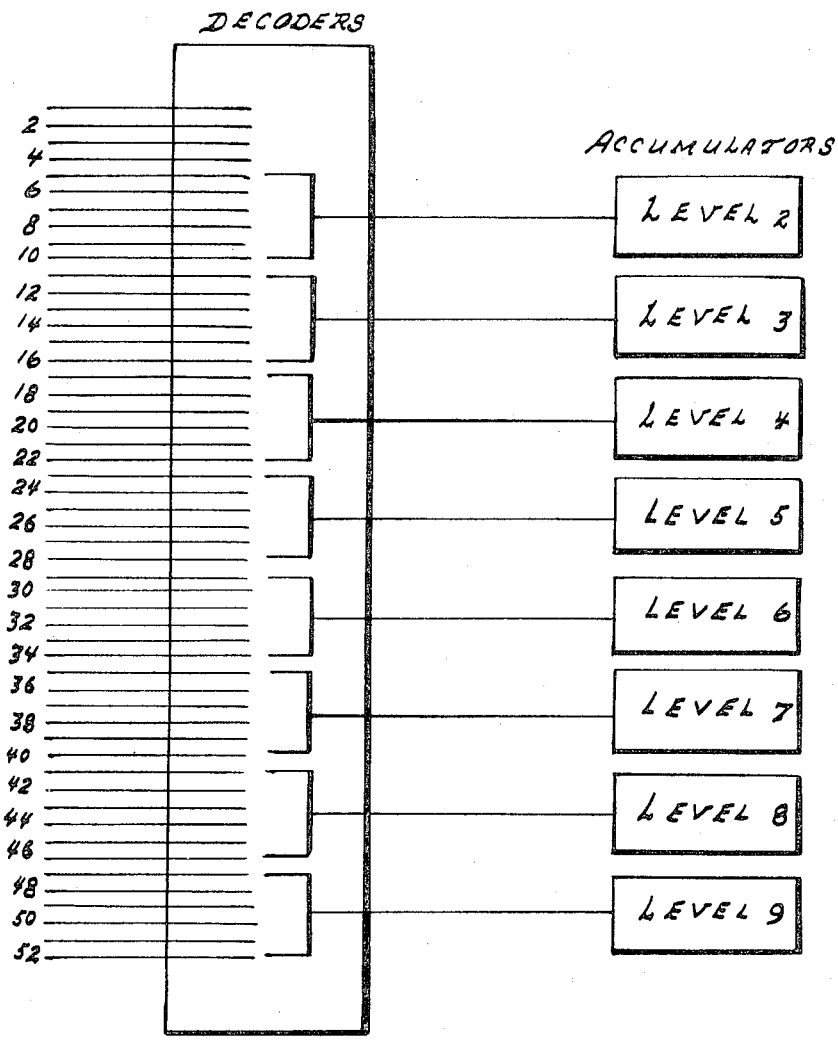
FIG. 4 is a functional diagram of the decoder.

On line 310, line counter 1 transfers out as described above. Only one ideal video pulse occurs on each of scan lines 310 to 320, but line counter 2 continues to count this particle, whereas line counter 1 does not see this particle. On scan line 321 the scan delay of line counter 2 starts the blanking pulse generator and the strobe pulse generator just as it did in lines 304 through 320. The input gates of the other line counters are blanked. The strobe pulse is compared with the selected video in the pulse detector. Since there is no shadow intersection on this line there is no ideal video pulse and hence no selected video. The pulse detector triggers the transfer sequence just as line counter 1 did at the end of its particle. This time there were 18 counts stored in the counter. The particle-size decoder decides this is a channel-4 particle so accumulator 4 is advanced one count. The above process can be performed with up to four particles on one scan line in a similar manner as was described for two. FIG. 4 shows the functional relationship of the decoder. The decoder consists of a series of gates for selecting the counts and is well known in the art.

At the end of the frame the ideal video generator and the TV monitor are inhibited for the next three scans. At the end of the fourth scan (the third inhibited scan) the vertical retrace triggers flash lamp 31. The ideal video pulse generator and TV monitor display 39 are uninhibited and the whole measuring procedure is repeated. This continues at the rate of 7.5 samples per μsec. for the sampling interval.

At the end of the sampling interval, the TV monitor display 39 and ideal video generator 43 are inhibited, and the readout cycle is initiated. A print command is sent to printing recorder 75 to record sampling time in channel 0. Part way through the print cycle the printer sends out a "scan" pulse that advances read out logic 77 one step, transfers the viewing volume information to printer 75, and then sends out another print command to print the viewing volume in channel 1. Accumulators 73 are read out sequentially in a similar manner into channel 2 through 9 on the printer. After channel 9 has been printed, a reset pulse is fed to accumulators 73 and to the sampling timer 79. The instrument will begin to take data again as described above. Sampling is stopped by rotating the timer switch on the front panel to the manual position and depressing the stop button. Read out logic 77 will print the time and all data stored before stopping.

We claim:
1. A system for analyzing a raindrop field comprising:
 a. a flashing light source;
 b. a vidicon camera with the rain field interposed between the light source and the vidicon camera;
 c. a video detector fed by the camera;
 d. an ideal video generator fed by the video detector;
 e. a plurality of delays fed by the detector;
 f. a first line counter and a plurality of delay line counters fed respectively by the ideal video generator and the plurality of delays, each line counter including,
  1. an input gate fed by the ideal video generator,
  2. a counter busy flip-flop fed by the input gate,
  3. a blanking pulse generator fed by the counter busy flip-flop,
  4. a counter enable circuit fed by the counter busy flip-flop,
  5. a strobe pulse generator fed by the counter busy flip-flop,
  6. a scan delay fed by the input gate and feeding the blanking pulse generator,
  7. a pulse detector fed by the strobe pulse generator and the input gate,
  8. a transfer command circuit fed by the pulse generator,
  9. an interval counter fed by the counter enable circuit and reset by the transfer command circuit, and
  10. a line count transfer gate fed by the interval counter and the transfer command circuit;
 g. a particle size decoder fed by the first line counter and having a sequence of outputs;
 h. a sequence of accumulator channels fed by the sequence of outputs of the particle size decoder; and
 i. a printer fed by the sequence of accumulator channels.

2. A system for analyzing a raindrop field according to claim 1 which further comprises a timing control fed by the vidicon camera and triggering the flashing light source and inhibiting the video generator.

3. A system for analyzing a raindrop field according to claim 2 which further comprises a telecentric optical system interposed between the flashing light source and the vidicon camera, the optical system having a turret controlled interchangeable magnifying lens.

* * * * *